United States Patent [19]

Okada et al.

[11] Patent Number: 4,961,113
[45] Date of Patent: Oct. 2, 1990

[54] NOISE REDUCTION CIRCUIT

[75] Inventors: Takashi Okada; Masumi Ogawa, both of Kanagawa; Mitsuyasu Asano, Tokyo; Masaru Nonogaki, Kanagawa, all of Japan

[73] Assignee: Sony Corporation, Tokyo, Japan

[21] Appl. No.: 294,699

[22] PCT Filed: Mar. 18, 1988

[86] PCT No.: PCT/JP88/00288
§ 371 Date: Jan. 10, 1989
§ 102(e) Date: Jan. 10, 1989

[87] PCT Pub. No.: WO88/07309
PCT Pub. Date: Sep. 22, 1988

[30] Foreign Application Priority Data

Mar. 19, 1987 [JP] Japan ................... 62-65067

[51] Int. Cl.$^5$ ............................................. H04N 5/213
[52] U.S. Cl. ......................................... 358/167; 358/36
[58] Field of Search ............................ 358/167, 36, 39

[56] References Cited

U.S. PATENT DOCUMENTS

| | | | |
|---|---|---|---|
| 3,715,477 | 2/1973 | Olson et al. | 358/167 |
| 4,009,334 | 2/1977 | Sypula | 358/167 |
| 4,015,076 | 3/1977 | Ishiodori | 358/167 |
| 4,268,855 | 5/1981 | Takahashi | 358/167 |
| 4,393,396 | 7/1983 | Raven et al. | 358/167 |
| 4,709,269 | 11/1987 | Ozaki | 358/167 |

FOREIGN PATENT DOCUMENTS

| | | |
|---|---|---|
| 0139408 | 11/1977 | Japan . |
| 55-102972 | 4/1979 | Japan . |
| 0197077 | 10/1985 | Japan ............. 358/167 |
| 0010369 | 1/1986 | Japan ............. 358/167 |
| 0276978 | 11/1988 | Japan . |
| 0292779 | 11/1988 | Japan . |
| 0016080 | 1/1989 | Japan . |
| 2206012 | 12/1988 | United Kingdom . |

*Primary Examiner*—Tommy P. Chin
*Assistant Examiner*—James Juo
*Attorney, Agent, or Firm*—Philip M. Shaw, Jr.

[57] ABSTRACT

A noise reduction circuit in which a video signal ($S_I$) is divided into a first signal ($S_L$) having low frequency component and a second signal ($S_{H1}$) having high frequency component, the above second signal ($S_{H1}$) is divided into a third signal ($S_{H2}$) having an amplitude more than a predetermined value and a fourth signal ($S_{H3}$) having an amplitude less than the predetermined value, a noise reduction process using a delay circuit (12) is applied to the above fourth signal ($S_{H3}$) to obtain a fifth signal ($S_{H4}$), and the above first signal ($S_L$), third signal ($S_{H2}$) and fifth signal ($S_{H4}$) are added, the noise reduction circuit being applicable to apply to a television receiver, etc.

12 Claims, 6 Drawing Sheets

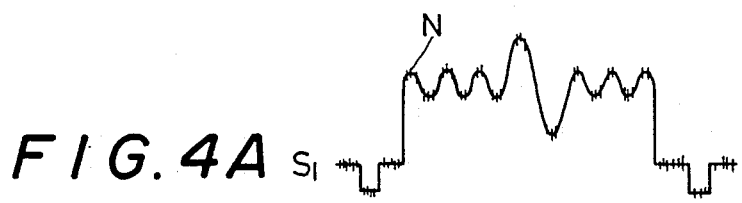
FIG. 4A $S_I$
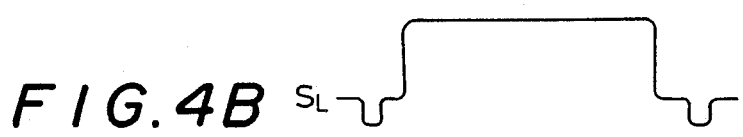
FIG. 4B $S_L$
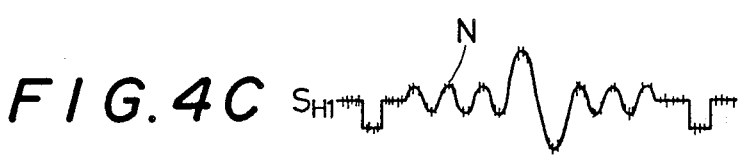
FIG. 4C $S_{H1}$
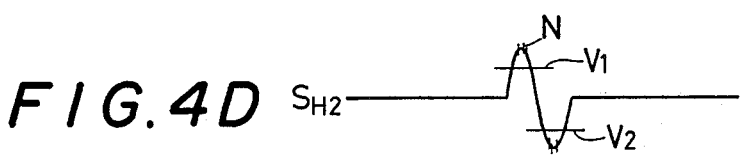
FIG. 4D $S_{H2}$
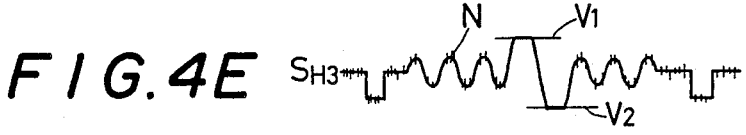
FIG. 4E $S_{H3}$
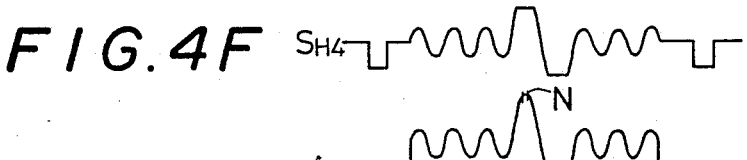
FIG. 4F $S_{H4}$
FIG. 4G $S_O$

NOISE REDUCTION CIRCUIT

DESCRIPTION

1. Technical Field

This invention relates to a noise reduction ciruit for video signals used in, for instance, a television receiver.

2. Background Art

As a noise reduction circuit used in a television receiver or the like, one shown in FIG. 6 is hitherto known.

In FIG. 6, input video signal $S_I$ fed at an input terminal 1 and containing noise passes through a low-pass filter 2 to become signal $S_L$, the low frequency component in which noises has been removed. Signal $S_L$ is supplied to an adder 3. The above input signal $S_I$ is also supplied to a high-pass filter 4 to obtain signal $S_{H1}$, the high frequency component containing the noise component from high-pass filter 4. Signal $S_{H1}$ is supplied to a limiter 5. Limiter 5 has the input/output characteristic as shown in FIG. 7, in which the output signal becomes zero when the level of input signal is within the range between $V_1$ and $V_Z$. Accordingly, a signal having a level above the above range of $V_1$ to $V_2$, that is, signal $S_{H2}$ in which noise component has been removed, is obtained from the above high frequency component signal $S_{H1}$ at limiter 5. Signal $S_{H2}$ is supplied to adder 3 to be added to signal $S_L$ in which the above high frequency component has been removed. As a result, output signal $S_O$ in which noise is reduced is obtained at an output terminal 6.

Further, a conventional noise reduction circuit using a delay circuit such as a field memory or a which frame memory is known, in which difference signal between the signal obtained by delaying input signal $S_I$ through a delay circuit such as a field memory or a frame memory, and input signal $S_I a$ is obtained, and the difference signal is subtracted form input signal $S_I$. Since the above difference signal is considered a noise component when there is no movement within a field or a frame in input signal $S_I$, noise can be reduced by that noise component being subtracted from input signal $S_I$. Accordingly, this circuit is provided with a movement detection ciruit for detecting movement is input signal $S_I$. When movement is detected, the above difference signal is considered noise component so inhibited from being subtracted from input signal $S_I$.

Another noise reduction circuit is proposed in Patent Kokai No. Sho 55-127737 by the present applicant.

DISCLOSURE OF THE INVENTION

As described above, in the noise reduction ciruit in FIG. 6, all low level components (ones within the range of $V_1$ to $V_2$) in high frequency signal $S_{H1}$ of input signal $S_I$ are condsidered noises. In practice, however, it may be that a signal component is contained within the range of $V_1$ to $V_2$. In that case, if the signal component is removed by limiter 5, the definition of image is lowered.

The noise reduction circuit using a field memory or a frame memory as described above has the further defects that it requires a large capacity memory in order not to lower the definition of image, and the circuit configuration becomes larger because the movement detection circuit is required.

For overcoming the above defects, in a noise reduction circuit according to the invention, a video signal is divided into a first signal having the low frequency component and a second signal having the high frequency component, the second signal is divided into a third signal having an amplitude more than a predetermined value and a fourth signal having an amplitude less than the predetermined value, a fifth signal is obtained by applying a noise reduction process using a delay circuit to the above fourth signal and the above first, third and fifth signals are added.

In the noise reduction circuit according to the invention, the noise reduction process using a delay circuit is effected as to the signal having an amplitude less than the predetermined value in the signal of the high frequency component, i.e. the fourth signal, so that the signal component of high frequency which is removed together with the noise component in a conventional noise reduction circuit is compensated for.

Accordingly, in the noise reduction circuit according to the invention, the definition if image is never lowered, and a large capacity memory is not required for the delay circuit. Since the movement component is low frequency, it is not contained by the high frequency component so the movement detection circuit can be omitted.

BRIEF DESCRIPTION OF DRAWINGS

FIGS. 4A–4G wave form charts of signals at points of FIG. 3;

THE BEST MODE FOR CARRYING OUT THE INVENTION

Figure 1:
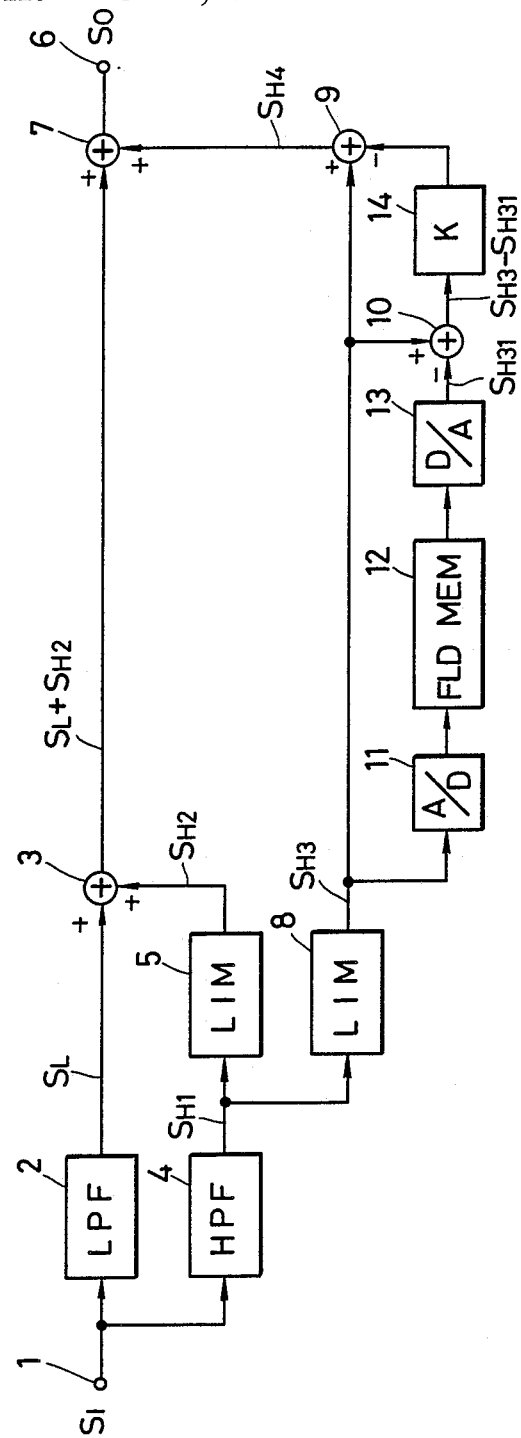
FIG. 1 is a block diagram showing a first embodiment of the invention.
Figure 6:
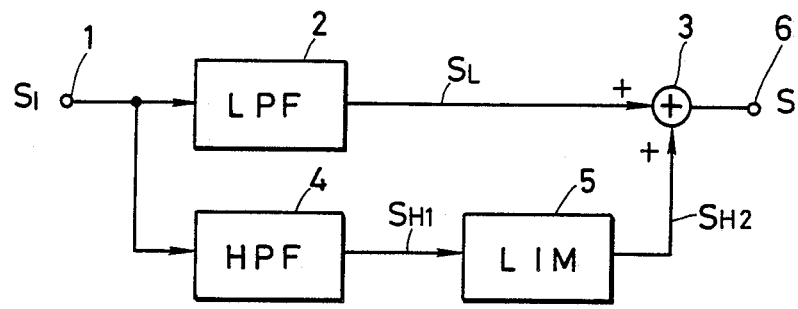
FIG. 6 is a block diagram of a conventional noise reduction circuit.

FIG. 1 shows a first embodiment of the invention, in which parts corresponding to those of FIG. 6 are denoted by the same references as those of FIG. 6 to omit the descriptions.

In FIG. 1, input terminal 1, low-pass filter 2 for obtaining the first signal $S_L$, adder 3, high-pass filter 4 for obtaining the second signal $S_{H1}$ and limiter 5 for obtaining the third signal $S_{H2}$ have the same constructions as those of FIG. 6. Output signal $S_L + S_{H2}$ of the above adder 3 is supplied to adder 7.

Figure 2:
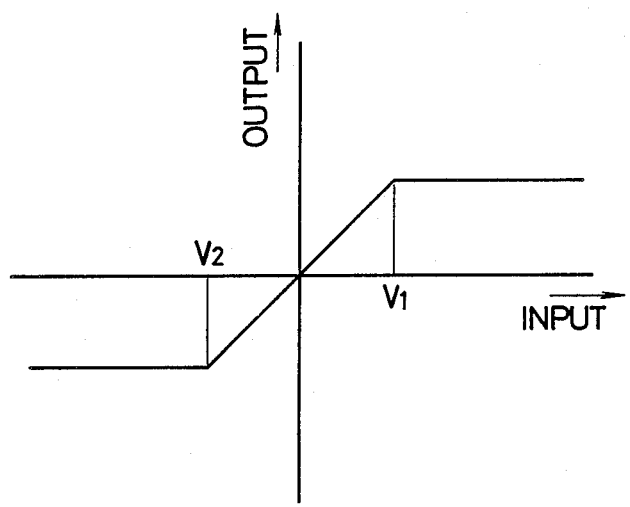
FIG. 2 is a graph showing a characteristic of the limiter of FIG. 1.

The above high frequency signal $S_{H1}$, as the second signal, as obtained from highpass filter 4, is supplied to limiter 8. Limiter 8 has the input/output characteristic shown in FIG. 2, in which output signal is obtained when input signal is within the range of $V_1$ to $V_2$, and output becomes constant when the level of input signal is out of the range of $V_1$ to $V_2$. Therefore, a signal between $V_1$ and $V_2$ in high frequency signal $S_{H1}$, that is, signal $S_{H3}$, the fourth signal containing a noise component is obtained from limiter 8. An noise reduction process using a delay circuit is effected as to signal $S_{H3}$ as follows. Signal $S_{H3}$ is supplied to adders 9 and 10, and to A/D converter 11 to be converted into digital signal, and then written in field memory 12 as in the above-mentioned delay circuit. The digital signal read from memory 12 is converted into analog signal $S_{H31}$ at D/A converter 13. Therefore, this analogue signal $S_{H31}$ is delayed from the above signal $S_{H3}$ by a field.

Signal $S_{H31}$ is supplied to adder 10 to be subtracted from the above signal $S_{H3}$. Difference signal $S_{H3}-S_{H31}$ between signal $S_{H3}$ and signal $S_{H31}$ obtained from adder 10 is to represent a noise componet for the reason described below. Signal $S_{H3}-S_{H31}$ of this noise component is multiplied by a predetermined coefficient K at multiplier 14, and then subtracted from signal $S_{H3}$ at adder 9. Accordingly, high frequency signal $S_{H4}$, as the fifth signal in which noises are reduced, is obtained from adder 7. Signal $S_{H4}$ is added to the above signal $S_L+S_{H2}$ to be output signal $S_O$ which is output at output terminal 6.

Next, it will be described that the above difference signal $S_{H3}-S_{H31}$ a is noise component.

If input signal $S_I$ is supplied directly to A/D converter 11 and adders 9 and 10, output signal of adder 10 represents the noise component or movement component of the image. For instance, in the case that input signal $S_I$ is a still video signal, when a 1-field delayed signal obtained from the D/A converter 13 is subtracted from input signal at adder 10, the subtraction output should become zero even if there is noise. Therefore, if the subtraction output itself is not zero, the subtraction output is noise. In the case that the input signal is not a still video signal, the subtraction output is detected whether it is noise or a movement component. If it is a movement component, it is required that the coefficient K of the next multiplier 14 is set to zero so as not to subtract the movement component. For this purpose, a movement detection circuit is required.

In this embodiment, high frequency signal $S_{H3}$ is supplied to A/D converter 11 and adders 9 and 10. Since any movement component of image is low frequency in general, little movement component is contained by the above signal $S_{H3}$. Accordingly, if the difference signal $S_{H3}-S_{H31}$ obtained from adder 10 is not zero, it may be substantially considered to be a noise component. Therefore, a movement detection circuit is not required in this embodiment.

If a movement detection circuit is provided for improving the accuracy, the movement detection circuit is disposed between the input and output of memory 12 or it is arranged so that the above difference signal $S_{H3}-S_{H31}$ is added thereto. In that case, the movement detection circuit may generate a movement detection signal by judging that there is movement when the input level is beyond a predetermined level. The movement detection signal is supplied to multiplier 14 to control the coefficient K.

In this embodiment, since noise detection using memory 12 is effected as to signal $S_{H3}$ having the narrow amplitude passed through limiter 8, the capacity of memory 12 can be decreased in comparison with the case in which the noise detection using memory 12 is effected as to the entire band of input signal $S_I$. According to experiments, it has been affirmed that the number of bits of signal processed by A/D converter 11, memory 12 and D/A converter 13 can be decreased from a conventional 8 bits to 6 bits.

Figure 3:
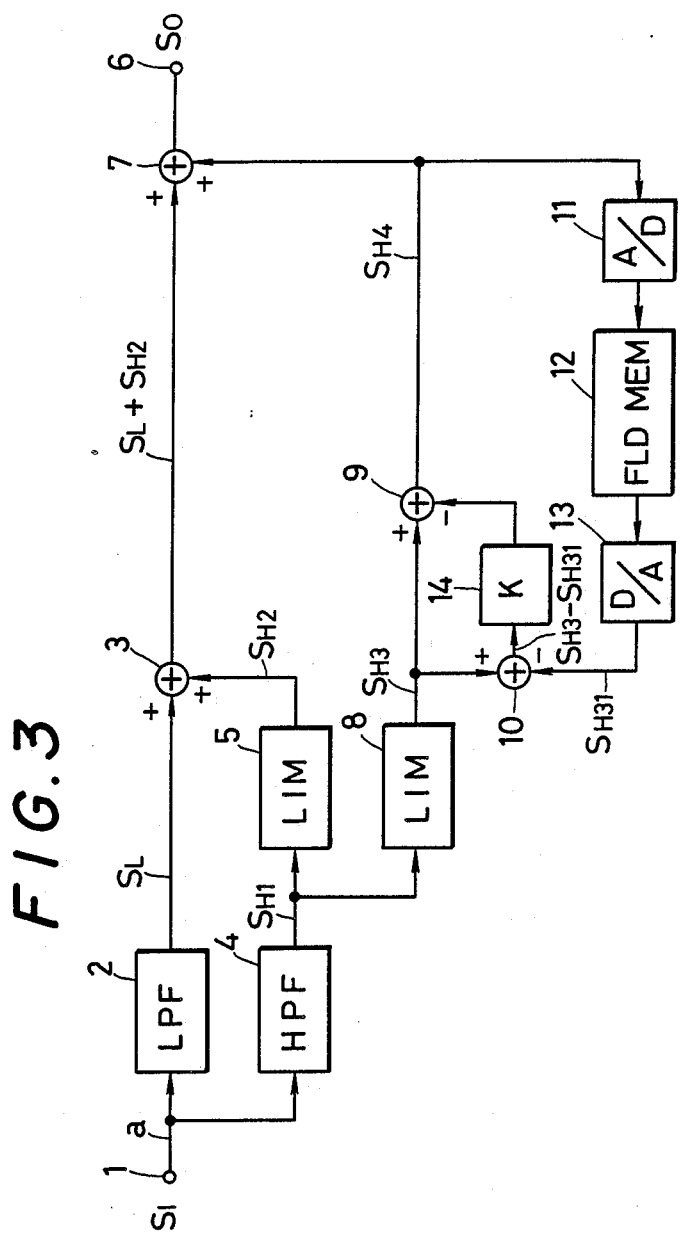
FIG. 3 is a block diagram showing a second embodiment of the invention.

FIG. 3 shows a second embodiment, in which parts corresponding to those of FIG. 1 are denoted by the same references as those of FIG. 1 to omit the descriptions.

In this embodiment, signal $S_{H31}$ is obtained by delaying by a field at memory 12 signal $S_{H4}$, created when the above signal $S_{H3}$ is passed through adder 9, and subtracted from signal $S_{H3}$ at adder 9, is the difference signal $S_{H3}-S_{H31}$, which is passed through multiplier 14 and subtracted from signal $S_{H3}$. Namely, by feeding back, after delaying by a field, signal $S_{H4}$ obtained from adder 9 in which noise is reduced, noise contained by signal $S_{H4}$ is removed gradually.

Figure 7:
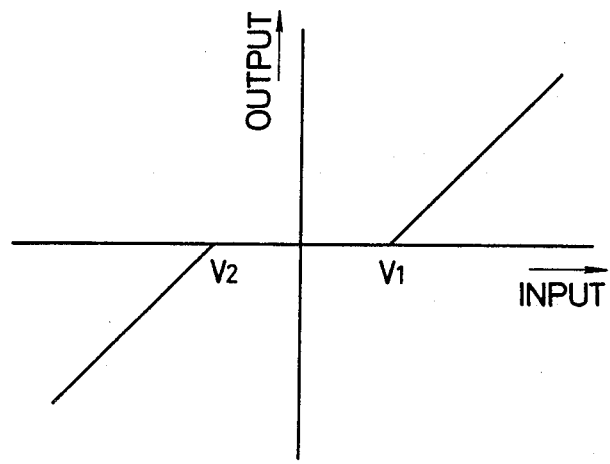
FIG. 7 is a graph showing the characteristic of the limiter of FIG. 6.

FIG. 4 show wave forms of signals $S_I$, $S_L$, $S_{H1}$, $S_{H2}$, $S_{H3}$, $S_{H4}$ and $S_O$ in FIG. 3, respectively. In FIGS. 3 and 4, signal $S_L$ in which the noise component and high frequency of video part are removed is obtained by the manner that input signal $S_I$ having noise N passes through low-pass filter 2. Signal $S_{H1}$ containing the noise component and high frequency video part is obtained by signal $S_I$ passing through high-pass filter 4. Signal $S_{H2}$ having an amplitude more than $V_1$ and $V_2$ in signal $S_{H1}$ is obtained by signal $S_{H1}$ passing through limiter 5 having the characteristic shown in FIG. 7. Signal $S_{H3}$ having the narrow amplitude between $V_1$ and $V_2$ is obtained by signal $S_{H1}$ passing through limiter 8 having the characteristic shown in FIG. 2. Signal $S_{H4}$ in which the noise component is reduced is obtained from adder 9. Output signal $S_O$ is obtained by adding signal $S_{H4}$ to signal $S_L+S_{H2}$ at adder 7. Although some noise remains in this output signal $S_O$, even if a signal component is contained by signal $S_{H2}$ obtained from limiter 5, it can be compensated with signal $S_{H4}$ to avoid lowering the definition of the image.

Figure 5:
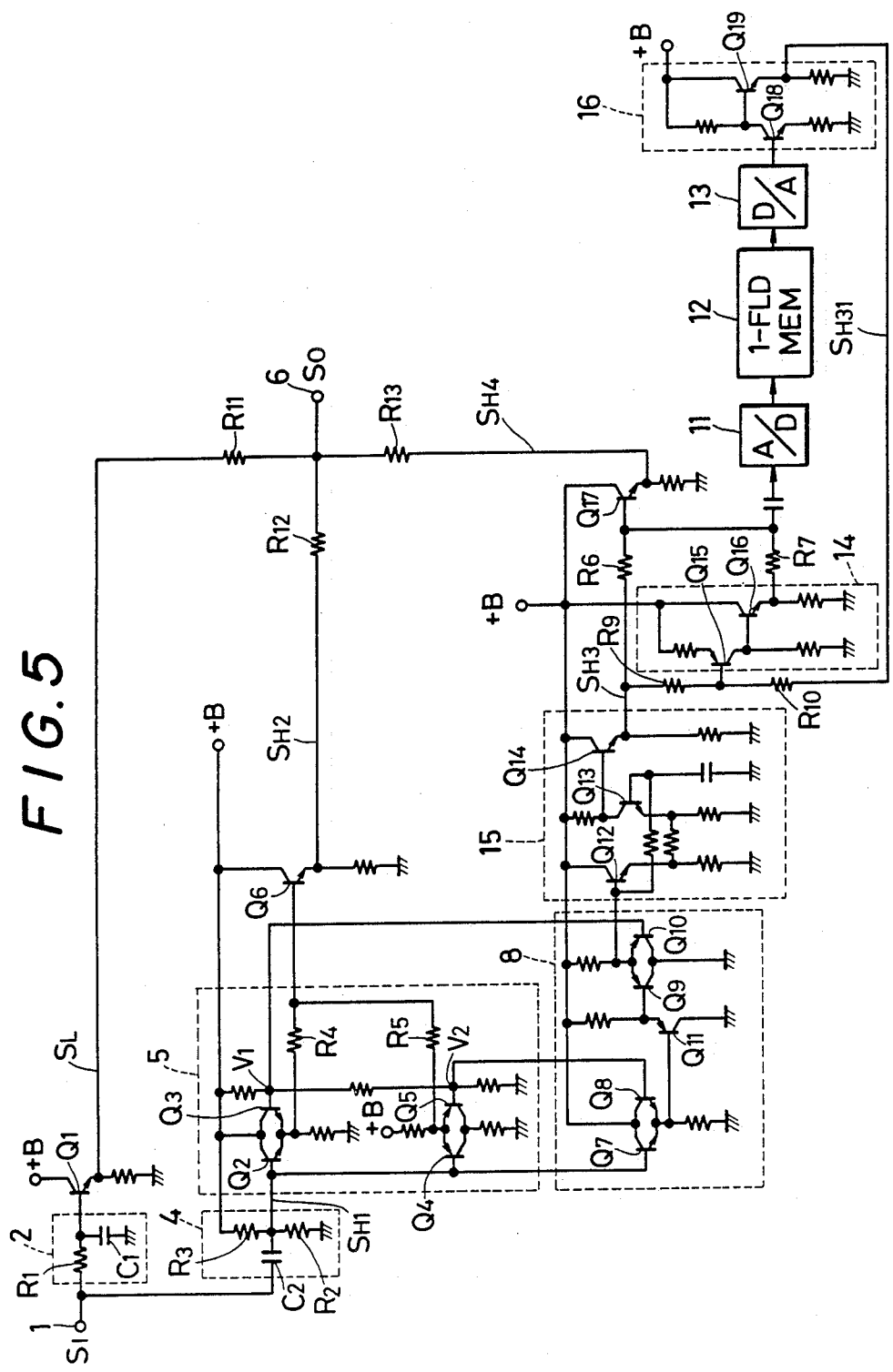
FIG. 5 is a circuit diagram showing an embodiment of an actual circuit configuration of FIG. 3.

FIG. 5 shows a concrete circuit configuration of each of circuit blocks of FIG. 3, in which parts corresponding to those of FIG. 3 are denoted by the same references as those of FIG. 4.

In FIG. 5, the low-pass filter 2 comprises resistance $R_1$ and capacitor $C_1$, the output signal $S_L$ of which is taken through an emitter follower of transistor $Q_1$. The high-pass filter 4 comprises capacitor $C_2$ and resisrances $R_2$ and $R_3$.

The limiter 5 is constructed by connecting in parallel a differential circuit of transistors $Q_2$ and $Q_3$ and a differential circuit of transistors $Q_4$ and $Q_5$. Output signal $S_{H1}$ of high-pass filter 4 is applied to the bases of transistors $Q_2$ and $Q_4$, and constant voltages $V_1$ and $V_2$ are applied to the bases of transistors $Q_3$ and $Q_5$. Accordingly, transistors $Q_2$ is turned on when signal $S_{H1}$ is beyond $V_1$, and transistor $Q_4$ is turned on when signal $S_{H1}$ is beyond $V_2$. The common emitter outputs of the two differential circuits are added to each other through resistances $R_4$ and $R_5$ to be output as signal $S_{H2}$ through an emitter follower of transistor $Q_6$.

The limiter 8 is constructed by connecting in series a differential circuit of transistors $Q_7$ and $Q_8$ and a differential circuit of transistors $Q_9$ and $Q_{10}$ through transistors $Q_{11}$. The voltage $V_2$ is applied to the base of transistor $Q_8$ and the above voltage $V_1$ is applied to the base of transistor $Q_{10}$. Accordingly, when signal $S_{H1}$ is beyond $V_2$, transistor $Q_7$ is turned on so that its output signal is applied from its emitter to the base of transistor $Q_9$ through transistor $Q_{11}$. When this base voltage is beyond $V_1$, transistor $Q_9$ is turned on so that its output signal is amplified by amplifier 15 comprising transistors $Q_{12}$, $Q_{13}$ and $Q_{14}$ to obtain signal $S_{H3}$. The above transistor $Q_{11}$ is for compensating for the voltage drop between the base and emitter of transistor $Q_7$.

The signal $S_{H3}$ is supplied to A/D converter 11 after being multiplied by K at amplifier 14 (multiplier 14 in FIG. 3) comprising transistors $Q_{15}$ and $Q_{16}$, and added to the above signal $S_{H3}$ through resistances $R_6$ and $R_7$. The added signal is taken as signal $S_{H4}$ through an emitter follower of transistor $Q_{17}$.

A signal converted into, for instance, a 6-bit digital signal by A/D converter 11 is reconverted into an analog signal by D/A converter 13 after being delayed by 1-field memory 12, and then inverted by inversion amplifier 16 comprising transistors $Q_{18}$ and $Q_{19}$. This inverted signal is added to the signal $S_{H3}$ through resistance $R_9$ and $R_{10}$, and the added signal is supplied to the amplifier 14.

Signals $S_L$, $S_{H2}$ and $S_{H4}$ obtained as above are added through resistances $R_{11}$, $R_{12}$ and $R_{13}$ to obtain output signal $S_O$ at output terminal 6.

Although field memory 12 is used in the first and second embodiments, a frame memory may be used of course.

According to the present invention, the definition of image is never lowered, and it has no need of a field memory or a frame memory of especially large capacity. Moreover, a noise reduction circuit in which a movement detection circuit is omitted can be provided. Therefore, the present invention is capable of being applied to a television receiver, etc.

We claim:

1. A method of reducing noise in a video signal comprising the steps of:
    dividing said video signal into a first signal containing the low frequency component of said video signal and a second signal containing the high frequency component of said video signal;
    dividing said second signal into a third signal having an amplitude more than a predetermined value and a fourth signal having an amplitude less than said predetermined value and containing noise;
    reducing noise in said fourth signal by means of a delay circuit to create a fifth signal; and
    adding said first, third and fifth signals together.

2. A method of reducing noise in a video signal according to claim 1, in which said delay circuit is a field delay circuit or frame delay circuit.

3. A method of reducing noise in a video signal according to claim 2, in which the step of reducing noise in said fourth signal by means of a delay circuit to create a fifth circuit further comprises the steps of:
    creating a difference signal by delaying said fourth signal and subtracting said delayed signal from said fourth signal;
    creating a fifth signal by subtracting said difference signal from said fourth signal.

4. A metehod of reducing noise in a video signal according to claim 1 or 2 further comprising the step of providing an analog to digital converter at the input side of said delay circuit and a digital to analog converter at the output side thereof.

5. A method of reducing noise in a video signal according to claim 4 in which said difference signal is determined by a feed-back loop.

6. A noise reduction circuit in a which a video signal is divided into a first signal containing the low frequency component of said video signal and a second signal containing the high frequency component of said video signal, comprising:
    limiter means for dividing said second signal into a third signal having an amplitude more than a predetermined value and a fourth signal having an amplitude less than said predetermined value and containing noise;
    delay circuit means for reducing noise in said fourth signal to create a fifth signal; and
    adding means for adding said first, third and fifth signals.

7. A noise reduction circuit according to claim 6, in which the delay circuit means comprises:
    a delay circuit for delaying said fourth signal;
    subtracting means for creating a difference signal by subtracting said delayed signal from said fourth signal;
    second subtracting means for creating a fifth signal by subtracting said difference signal from said fourth signal.

8. A noise reduction circuit according to claim 7, in which said delay circuit is a field delay circuit or frame delay circuit.

9. A noise reduction circuit according to claim 7 further comprising an analog to digital converter at the input side of said delay circuit and a digital to analog converter at the output side thereof.

10. A noise reduction circuit according to claim 6, in which the delay circuit means comprises:
    a delay circuit for producing a delay signal;
    subtracting means for creating a difference signal by subtracting said delay signal from said fourth signal;
    second subtracting means for creating a fifth signal by subtracting said difference signal from said fourth signal; and
    feedback means for feeding said fifth signal back to said delay circuit.

11. A noise reduction circuit according to claim 10 further comprising an analog to digital converter at the input side of said delay circuit and a digital to analog converter at the output side thereof.

12. a noise reduction circuit according to claim 10, in which said delay circuit is a field delay circuit or frame delay circuit.

* * * * *